US007245612B2

(12) United States Patent
Petty et al.

(10) Patent No.: US 7,245,612 B2
(45) Date of Patent: Jul. 17, 2007

(54) INTERNET CALL WAITING WITH VOICEMAIL SYSTEM THAT PROVIDES MONITORING DURING RECORDING

(75) Inventors: Douglas T. Petty, Nepean (CA); Michael W. Petras, Nepean (CA); James J. Boland, Kanata (CA); David P. Dunlap, Nepean (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1015 days.

(21) Appl. No.: 10/240,212

(22) PCT Filed: Mar. 21, 2001

(86) PCT No.: PCT/CA01/00370

§ 371 (c)(1),
(2), (4) Date: Sep. 30, 2002

(87) PCT Pub. No.: WO01/76210

PCT Pub. Date: Oct. 11, 2001

(65) Prior Publication Data
US 2003/0108172 A1 Jun. 12, 2003

(51) Int. Cl.
*H04L 12/66* (2006.01)
*H04L 12/56* (2006.01)
*H04M 1/64* (2006.01)
*H04M 11/00* (2006.01)
*H04M 1/56* (2006.01)
*H04M 3/42* (2006.01)

(52) U.S. Cl. .................. 370/356; 370/392; 379/88.17; 379/88.18; 379/88.21; 379/93.35; 379/142.08; 379/201.07; 379/201.08; 379/215.01

(58) Field of Classification Search .................. None
See application file for complete search history.

(56) References Cited

U.S. PATENT DOCUMENTS

| 5,805,587 A | 9/1998 | Norris et al. ............... 370/352 |
| 5,946,381 A | 8/1999 | Danne et al. ............... 379/142 |
| 5,951,638 A | 9/1999 | Hoss et al. ................. 709/206 |
| 5,982,774 A | 11/1999 | Foladare et al. ............ 370/401 |
| 6,041,103 A | 3/2000 | La Porta et al. ........... 379/67.1 |
| 6,078,581 A * | 6/2000 | Shtivelman et al. ........ 370/352 |

(Continued)

FOREIGN PATENT DOCUMENTS

EP 0 856 981 A2 1/1998

*Primary Examiner*—Chi Pham
*Assistant Examiner*—Melanie Jagannathan
(74) *Attorney, Agent, or Firm*—Kent Daniels; Ogilvy Renault LLP

(57) ABSTRACT

An Internet Call Waiting (ICW) service provides single-line subscribers (100) connected to the Internet with incoming call information, call screening and voice messaging capabilities. An incoming call is terminated at an ICW server (154). The caller is prompted to leave a voice message and the voice message is relayed in real-time over the Internet connection (138) to permit the subscriber to monitor the message. The subscriber can choose to answer the call at any time before the caller disconnects. Subscriber profile options specify how calls are treated. Calls may be forwarded to a second directory number, directed to a Voice-over-IP (VoIP) connection, or the Internet connection may be dropped and the call completed to the subscriber's directory number. The subscriber benefits from being able to screen voice messages in real-time, which assists the subscriber in determining how the call should be terminated.

23 Claims, 6 Drawing Sheets

U.S. PATENT DOCUMENTS

| | | | |
|---|---|---|---|
| 6,253,249 B1 * | 6/2001 | Belzile | 709/249 |
| 6,343,119 B1 * | 1/2002 | Creamer et al. | 379/100.01 |
| 6,385,306 B1 * | 5/2002 | Baxter, Jr. | 379/88.13 |
| 6,704,394 B1 * | 3/2004 | Kambhatla et al. | 379/67.1 |
| 6,816,469 B1 * | 11/2004 | Kung et al. | 370/260 |
| 6,907,112 B1 * | 6/2005 | Guedalia et al. | 379/88.17 |

* cited by examiner

INTERNET CALL WAITING WITH VOICEMAIL SYSTEM THAT PROVIDES MONITORING DURING RECORDING

TECHNICAL FIELD

The invention relates to a call-waiting feature for telephone service subscribers. In particular, the invention relates to methods and a system for providing voice call information, voice call screening and voice messaging capabilities for a called telephone station set that is busy as a result of being connected to a data network, such as the Internet.

BACKGROUND OF THE INVENTION

Internet access is made available to home users by Internet Service Providers (ISPs). Typically, home users subscribe to Internet dial-up services available from ISPs, and use home personal computers (PCs) to connect to the ISPs via modems connected to the Public Switched Telephone Network (PSTN) by Plain Old Telephone Service (POTS), subscriber lines. In operation, a modem places the POTS subscriber line off-hook, dials a directory number (DN) associated with the ISP providing Internet access, and establishes a data connection with terminating equipment maintained by the ISP.

With the increasing variety of Internet services being provided, PCs are being connected to the Internet for increasingly longer periods of time. With the subscriber line in an off-hook condition, telephone calls placed to the subscriber receive busy treatment unless a call alerting system is available. Prior art methods of alerting a subscriber to an incoming call while a telephone termination is off-hook are typically subscription based and referred to as "Call Waiting" services. Call Waiting provides, during a telephone session between two parties, an audible alert to the called party, signifying that another telephone call has just been placed and is awaiting an answer. Such services work well for voice calls, but do not integrate well with data connections established using a modem for accessing the Internet because the Call Waiting alert disrupts the data connection. The Call Waiting service is therefore usually disabled by the user during an Internet session.

The problem of alerting the home PC user of incoming telephone calls during an Internet session, is addressed in many prior art references. For example, U.S. Pat. No. 5,805,587 entitled CALL NOTIFICATION FEATURE FOR A TELEPHONE LINE CONNECTED TO THE INTERNET, which issued Sep. 8, 1998 to Norris et al., describes a facility for alerting a subscriber whose telephone station set is connected to the Internet of a waiting telephone call. The alert is sent through the Internet connection. The waiting call is forwarded via the PSTN to a services platform which in turn establishes a connection to the subscriber using the Internet. The service platform notifies the subscriber of the waiting call via the Internet connection. Information, limited to Caller Identification (ID) or Automatic Number Identification (ANI) information, is provided to the subscriber. The services platform may forward the waiting telephone call to the subscriber via the Internet responsive to a subscriber request to do so.

U.S. Pat. No. 5,946,381 entitled CONTROLLING INCOMING CALLS VIA THE WORLDWIDE WEB, which issued Aug. 31, 1999 to Danne et al., describes a method and system in which an incoming call is routed to a service node with a Worldwide Web interface. Responsive to an incoming call, an "alert" software routine is executed in the service node, which sends an alert message to a Java software application executing on a called party's Internet connected terminal (i.e., a personal computer). The Java application causes a window to be displayed on the called party's terminal, which shows pertinent information about the calling party. The displayed window also contains "buttons" that permit the called party to choose whether to accept the call, reject the call, hold the call or re-direct the call to another phone.

U.S. Pat. No. 5,982,774 entitled INTERNET ON HOLD, which issued Nov. 9, 1999 to Foladare et al., describes methods of enabling a user connected to the Internet, over a telephone line, through an Internet access provider, to place the Internet connection on hold to answer an incoming telephone call. The user is informed of the waiting call by means of a signal sent by a local exchange carrier to the Internet access provider, indicating the presence of the waiting call and the identity of the calling party. This information is then transmitted by the Internet access provider. Upon an affirmative decision to take the call, indicated to the Internet access provider by means of a "click" on the screen of the user's terminal, the call to the Internet access provider is placed on hold and the incoming call is connected through to the user's telephone set.

U.S. Pat. No. 6,078,581 entitled INTERNET CALL WAITING, which issued Jun. 20, 2000 to Shtivelman et al., describes a telephony call-waiting system for clients having a computer with a video display unit, adapted to keep a status indication of a client's Internet connection status. During periods of time that the client is accessing the Internet, the system alerts the client of any waiting PSTN calls by sending an "alert" signal over the Internet connection. An audio and/or visual alert event is provided by the computer on receiving the "alert" signal. Information such as Caller ID can be provided. The system also provides for a client-initiated response to an alert accepting or rejecting a waiting call. Provisions are made for connecting the waiting call to the client's computer premises as an Internet protocol (IP) call. A facility is also provided to permit the client to deal with multiple waiting calls.

Although meritous, the above mentioned inventions only provide Caller ID and/or ANI information for screening purposes. The call screening information is derived from the phone number of the subscriber line from which the caller is placing the call, therefore providing to the called party with only the originating DN (if available). In many cases, the originating DN is not adequate to identify the calling party. Examples in which Caller-ID and ANI information fails to provide adequate screening information include when a caller calls from someone else's telephone set, or calls from a public telephone, or some other unknown or unrecognized number. Besides, the nature or intent (i.e., subject matter) of the call, and other relevant information, can only discovered by the called party after accepting the call.

U.S. Pat. No. 6,041,103 entitled INTERACTIVE CALL IDENTIFICATION, which issued Mar. 21, 2000 to La Porta et al., addresses the need for caller information prior to accepting a call, to assist a call recipient in screening the call. La Porta describes a method and system for interactively identifying a telephone call on a communications network as part of call establishment procedures. When a telephone call is placed to the called party, it is routed to a server element on the PSTN, which terminates the call. The server then prompts the calling party for a message. When this message is received, the first telephone connection is put on hold and a second telephone connection is established between the server element and the called party. The screening message is relayed to the called party over the second telephone connection. If the called party accepts the call, the server element bridges the two calls. This invention only addresses telephone calls originating and terminating on voice terminals. It does not provide call screening to called parties who are using their telephone line to connect to the Internet. Furthermore, the solution may be regarded as intrusive by some callers because they are prompted to provide a screening message every time they call a party subscribing to this service.

As is evident from the foregoing, there remains a need for a method and system that permit subscribers to screen incoming telephone calls in real-time, and in a non-intrusive manner, when the telephone calls are directed to a PSTN termination engaged in an Internet session established over POTS service facilities.

SUMMARY OF THE INVENTION

It is an object of the invention to enable a user connected to the Internet via a dial-up connection to an Internet service provider to screen incoming telephone calls while on-line, using information provided in real-time by the calling party.

According to one aspect of the invention a method is provided for screening incoming telephone calls at a data network node connected to a data network via a Plain Old Telephone Service (POTS) termination. Notification of a waiting call placed by a calling party from a remote station to the POTS termination of a subscriber is received at the data network node. A call treatment option for the waiting call is selected by the subscriber from a call treatment selection displayed at the data network node. A waiting call is bridged through to the data network node over the data connection on selection of a "call screening" option. A greeting message is sent to the calling party informing the calling party of the current unavailability of the called party (the subscriber), requesting that the calling party leave a message stating the intention of the call. The message being left by the calling party is relayed in real-time over the data connection to the data network node. A real-time connection between the calling party and the subscriber can be established if the subscriber selects an "answer" call treatment option.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

An Internet Call Waiting (ICW) service is provided. The ICW service provides single-line telephone service subscribers connected to the Internet with incoming call information, call screening and voice messaging services.

Figure 1:
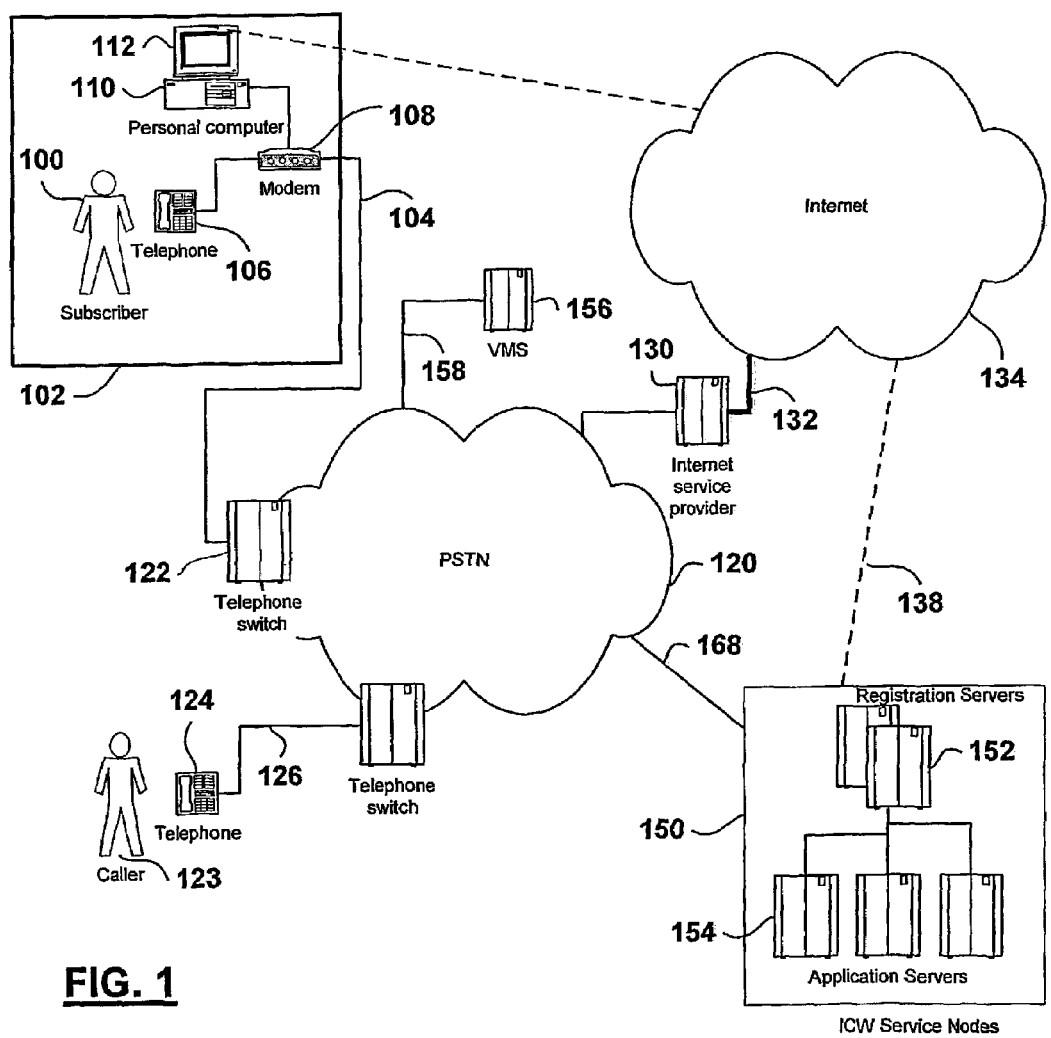
FIG. 1. is a schematic connection diagram showing networks and network elements interconnected to provide an Internet Call Waiting (ICW) service in accordance with an embodiment of the invention.

FIG. 1 is a schematic diagram illustrating networks and network elements interconnected to provide an Internet Call Waiting (ICW) service in accordance with an embodiment of the invention. An ICW service subscriber 100, located at customer premises 102, uses a local loop 104 to access a Public Switched Telephone Network (PSTN). The local loop 104 is associated with a Directory Number, (DN) and provides Plain Old Telephone Service (POTS) service to the subscriber 100. The subscriber's telephone set 106 is connected to the local loop 104, as is a modem 108. The modem 108 provides data connectivity between the subscriber's Personal Computer (PC) 110 and data services such as, but not limited to, the Internet. Such data services may include public and private data services. The subscriber's PC 110 has a user interface including a display screen 112. It also has a pointing device, a keyboard, a microphone and speakers, as is well known in the art.

The local loop 104 is connected to the PSTN 120 via a local telephone switch 122. The PSTN 120 provides telephone services to the subscriber 100 as well as to other service subscribers, such as a caller using telephone set 124. The caller's telephone set 124 is connected to the PSTN 120 via a local loop 126.

In accordance with an embodiment of the invention, subscriber 100 uses the modem 108 to connect to an access server, such as an Internet Service Provider (ISP) 130. The ISP 130 has connections to the PSTN, so that the modem 108 can be used to establish a dial-up connection thereto. The ISP 130 provides access to a data network, such as the Internet 134, through a backbone connection 132. Once a dial-up connection is established between the modem 108 and the ISP 130, a data connection can be established between the subscriber's PC 110 and the data network or Internet 134.

When the modem 108 is used to access the ISP 130 over the local loop 104, the local loop is busy. Ordinarily, telephone calls placed to the subscriber's directory number receive a busy call treatment if a dial-up connection is established.

Call Forward on Busy Line (CFBL) is a telephone service feature that enables the redirection of calls placed to an off-hook local loop to another PSTN termination. In accordance with the invention, the user's local loop 104 is provisioned with the CFBL feature so that calls made to the user's PSTN termination while the user's local loop 104 is busy, are redirected to an ICW service node 150. As such, calls are redirected to the ICW service node 150 whether the subscriber 100 is engaged in a telephone conversation, or connected to the Internet 134. The CFBL feature is triggered in the local telephone switch 122 that serves the local loop 104.

In accordance with an embodiment of the invention, the ICW service is provided by a plurality of ICW service nodes 150 strategically located in a service area, though only one is shown in FIG. 1. ICW service nodes 150 include ICW registration servers 152 and ICW application servers 154. ICW service nodes 150 are Internet nodes and are connected to the Internet 134 via an IP link 138. The ICW service may also use external voice message systems (VMS) in the PSTN 120 such as VMS 156. The VMS 156 is connected to the PSTN 120 via Integrated Services Digital Network (ISDN) trunks 158.

The ICW service nodes 150 are also connected to the PSTN 120 by telephone trunks 168. The trunks 158 are preferably Primary Rate Interface (PRI) ISDN trunks. The ICW application servers 154 receive information about incoming calls directed to monitored PSTN terminations from the ISDN User Part (ISUP) call Set-Up messages. The ISUP call Set-Up message contains call information such as the calling party name and/or DN (Directory Number) and the called party DN.

In accordance with other embodiments of the invention, connectivity between ICW service nodes 150 and the PSTN 120 may include Computer Telephony Interface (CTI) devices as gateways, ISDN/IP gateways, Message Transfer Points (MTPs), etc.

The provision of the ICW service preferably includes the use of at least two ICW registration servers 152, to enable mitigation of trunk overflow conditions or service outages. Each ICW registration server 152 can function as a primary ICW registration server for delivering the ICW service to a particular ICW subscriber, and support ICW service activation and registration. The other ICW registration server 152 functions as a secondary ICW registration server for delivering the ICW service to a particular ICW subscriber, either in a tandem or standby configuration.

Each ICW registration server 152 preferably maintains a complete copy of ICW subscriber profiles. The ICW registration servers 152 may be provisioned to synchronize accumulated ICW service-related information between each other. Methods for the synchronization of stored information are known to persons skilled in the art. The ICW registration servers 152 may be co-located or geographically dispersed.

The provision of the ICW service also includes the use of a group of ICW applications servers 154. Each ICW application server 154 preferably has a complete copy of ICW call processing software. Dependent on a particular implementation of the invention, each ICW application server 154 also has copies of prerecorded announcements, examples of which are presented in Table 1, which is described below. The ICW application servers 154 are grouped to provide redundancy and to ensure adequate capacity for quality of ICW service delivery. Two types of traffic are carried over the data link 138, ICW service traffic between the ICW service nodes 150 and ICW client computers 110, and operating software updates.

The ICW service is normally offered on a subscription basis. An ICW service activation process includes a subscriber information collection step, and a subscriber profile creation step. The information collection step may include prompt-based information collection, but other methods of information collection may be used. The collected subscriber information includes, for example, subscriber's name, user-id, password, e-mail address, DN and subscriber's preference settings.

ICW client software runs on the subscriber's personal computer (PC). It provides a user interface to the subscriber, as well as handling communications with the ICW call processing software residing on the ICW service nodes 150. An ICW client software download step may be required prior to an ICW client software installation step. The ICW client software includes qualified domain names and/or IP addresses of the ICW registration servers 152, and may also include a provisioning script. The scope of the invention contemplates web appliances having the ICW client software pre-installed as delivered. The installation step may also include a configuration and activation step for the CFBL feature described above.

Figure 2:
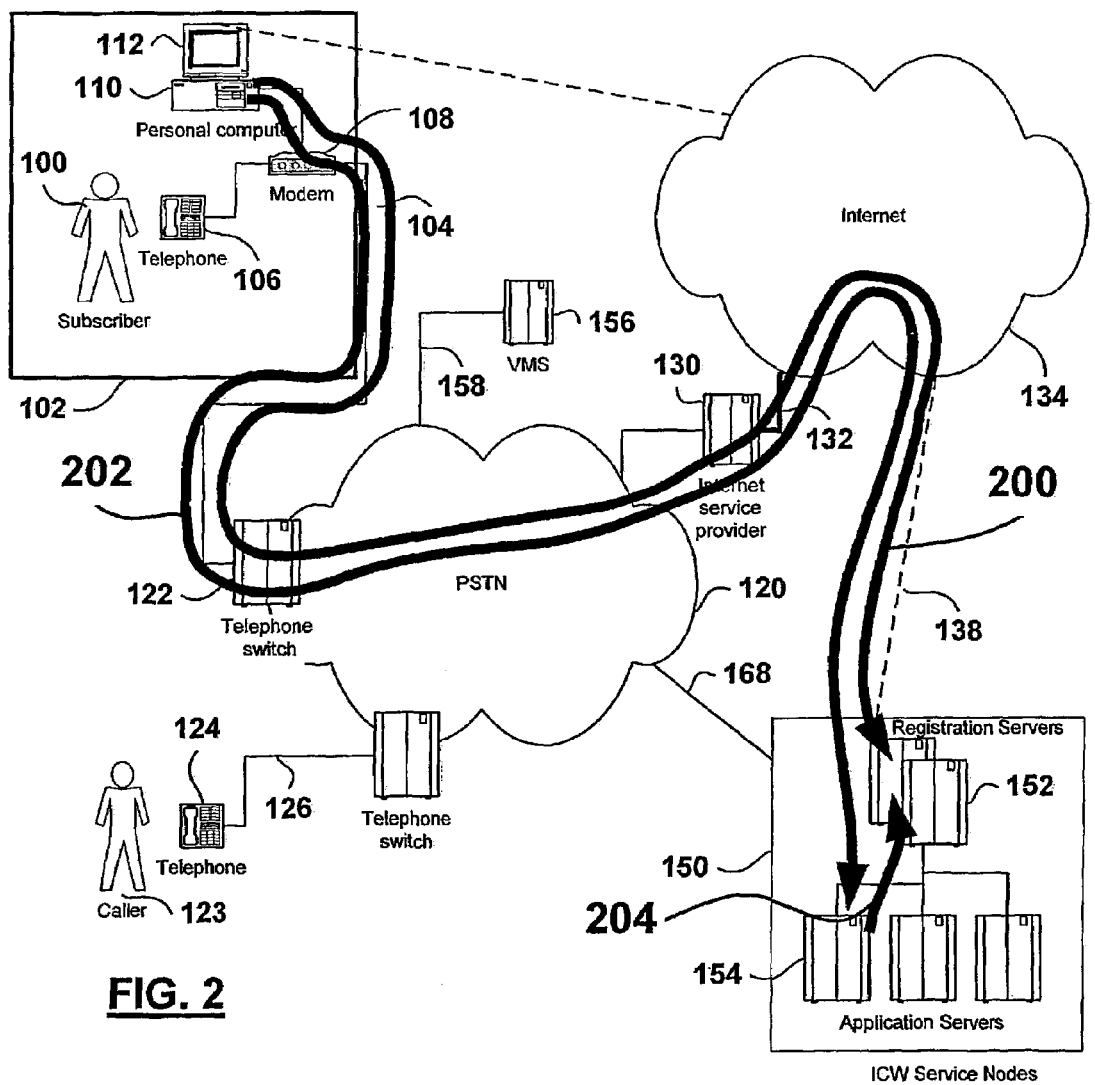
FIG. 2 is a schematic diagram showing connections being established in activating the ICW service for an ICW subscriber in accordance with an embodiment of the invention.

FIG. 2 is a schematic diagram showing connections established for activating the ICW service for an ICW subscriber, in accordance with the invention. To activate the ICW service, the ICW client software application establishes a first Internet connection 200 with the primary ICW registration server 152 to request an assignment of an available ICW application server 154. Subsequent to the assignment of an ICW application server 154, the ICW client software application establishes a second Internet connection 202 for activating the ICW service with the assigned ICW application server 154 to run the provisioning script. The ICW application server 154 completes the ICW service activation by establishing a third connection 204 to the ICW registration server 152 to create an ICW subscriber profile.

Thereafter, when the subscriber logs on to the Internet, the ICW client software application executing on an Internet connected Personal Computer (PC) at the subscriber's premises registers with an ICW service to receive ICW call waiting notifications. The ICW client software application may be configured to run as a background execution process on the ICW subscriber's PC 110. For this purpose the ICW client software application can be configured to start up automatically using methods well know to persons skilled in the art. The ICW client software application may also be configured to register with the ICW automatically on the establishment of an Internet connection between the ICW subscriber's PC 110 and the ISP 130. One way of accomplishing this is to configure the ICW client software application to periodically check for Internet activity. When the ICW subscriber's PC 110 connects to the Internet, the ICW client software application can detect for example, assignment of an IP address to the subscriber's PC 110. If the ICW client software application is configured to register with the ICW service automatically, the ICW service will start automatically after the Internet connection is established. On detection of Internet activity the ICW client software application may, if not configured to register automatically, prompt the ICW subscriber 100 for registration information.

Figure 3:
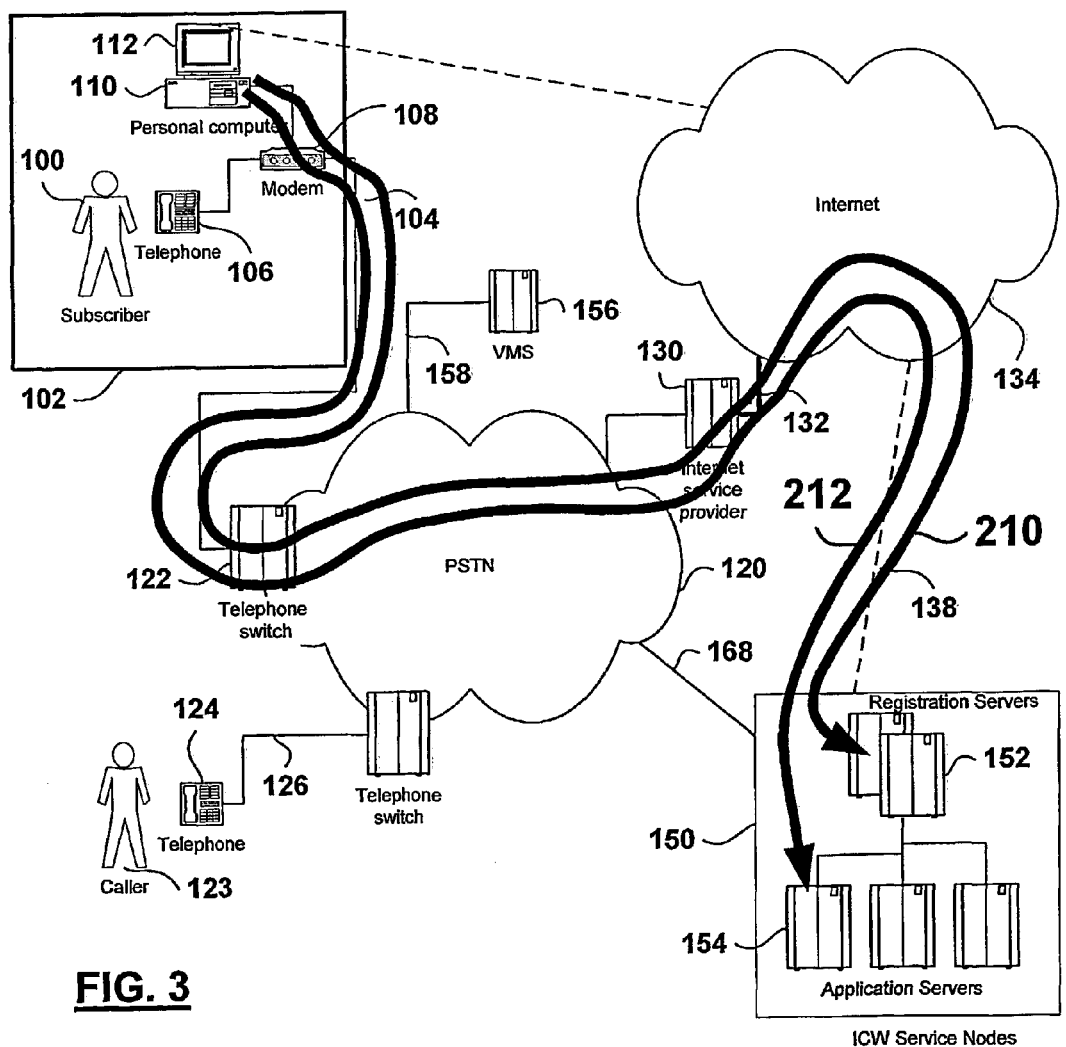
FIG. 3 is a schematic diagram showing connections being established in registering the ICW subscriber's PC with the ICW service in accordance with an embodiment of the invention.

FIG. 3 is a schematic diagram showing connections being established to register the ICW subscriber's PC with the ICW service at the beginning of an Internet session. The registration includes establishing a first Internet connection 210 with the primary ICW registration server 152. On establishing the first Internet connection 210, the ICW registration server 152 extracts the IP address of the ICW subscriber's PC 110. It then authenticates the ICW subscriber 100 with the ICW service on receipt of a user-id and password forwarded from the ICW client software application, and retrieves the ICW subscriber's profile, if the subscriber is authenticated. The ICW registration servers 152 also mediate connections among the ICW client software applications running on ICW subscriber PCs 110 and the ICW application servers 154. The ICW registration server 152 assigns one ICW application server 154 to provide ICW services to the ICW subscriber 100 for a duration of the ICW session. Once an ICW application server 154 is assigned to the ICW session, the ICW client software application establishes a second Internet connection 212 with the ICW application server 154. The subscriber's PC 110 is referred to as an ICW client when it is connected to the Internet, running the ICW client software application, registered with an ICW registration server 152 and engaged in an ICW session. The ICW client software application may run a start-up script to address ancillary ICW service functions. The start-up script may also update ICW subscriber preferences, as required.

Figure 4:
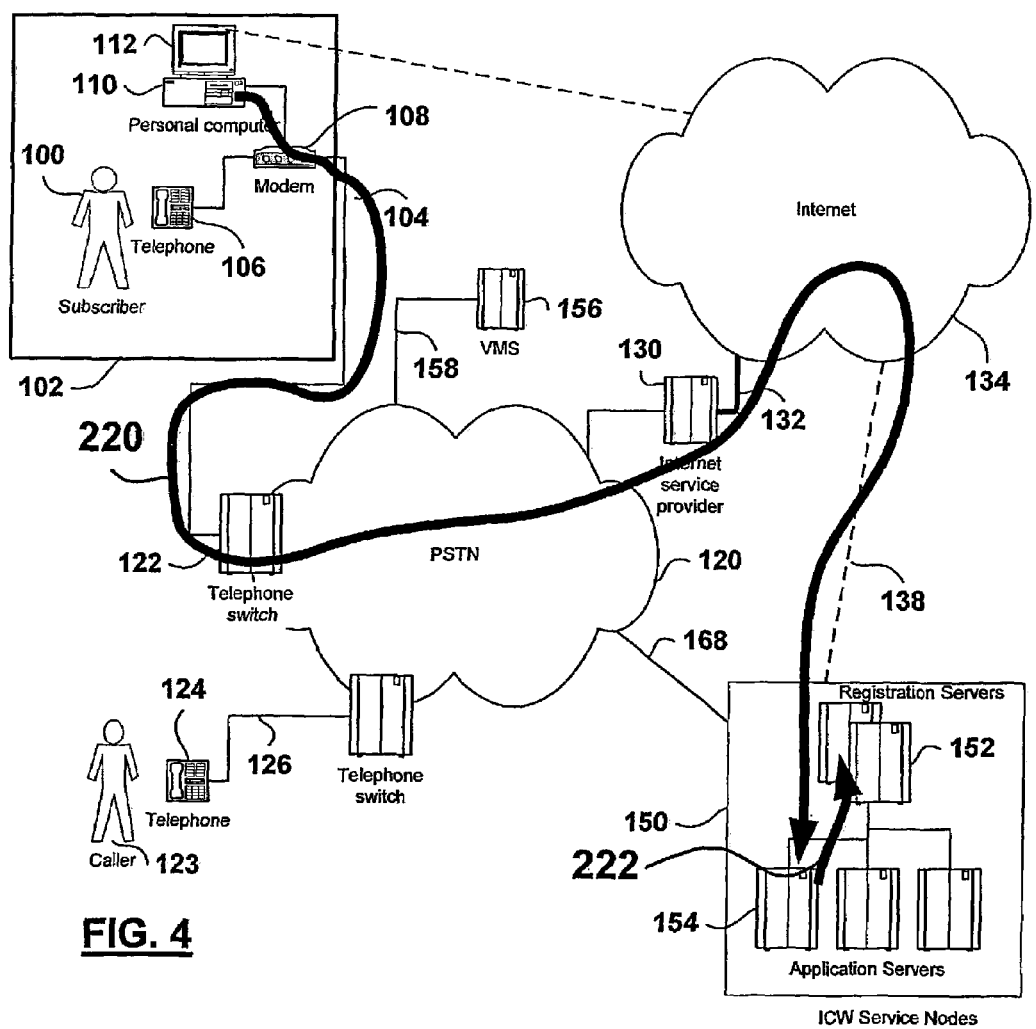
FIG. 4 is a schematic-diagram showing connections being established in updating an ICW subscriber profile in accordance with an embodiment of the invention.

An ICW subscriber profile update process will be described below with reference to FIG. 4. In accordance with the invention the ICW client software application preferably re-registers with the ICW registration server at regular intervals. This process ensures that the ICW subscriber's preferences, on-line status, and IP address are updated regularly. The re-registration time interval may be set, for example, to occur at intervals of 10–20 minutes. If the ICW client computer 110 loses Internet connectivity during an ICW session, as soon as the Internet connection has been re-established, the ICW registration server 152 is updated with the new IP address of the ICW client computer 110.

Subscriber information stored in a subscriber profile may be modified using the ICW client software application. FIG. 4 is a schematic diagram showing connections established to update an ICW subscriber profile in accordance with an embodiment of the invention. When an ICW subscriber 100 makes changes to his service preferences, the ICW client software application communicates the changes to the assigned ICW application server 154. To communicate the changes, the ICW client software application establishes a first Internet connection 220 to the ICW application server 154, and an ICW subscriber information update script is run. Alternatively, TCP/IP messages may be exchanged between the ICW client computer 110 and the ICW application server 154, the messages containing ICW subscriber profile modifications. To complete the ICW profile modifications, the ICW application server 154 establishes a connection 222 to at least one of the ICW registration servers 152 to update the ICW subscriber profile.

Figure 5:
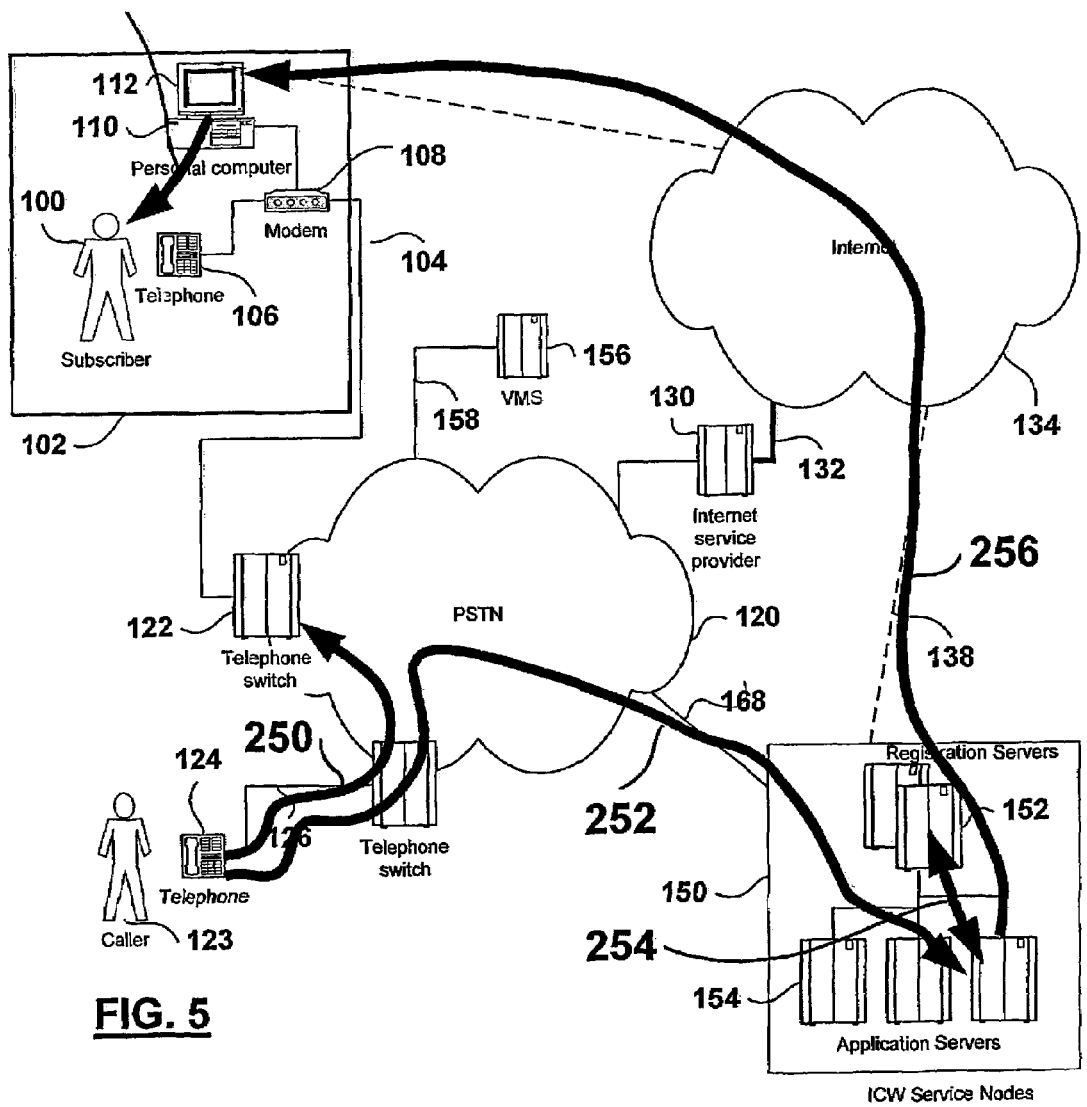
FIG. 5 is a schematic diagram showing connections being established in notifying a registered ICW client computer of a waiting call in accordance with an embodiment of the invention.

FIG. 5 is a schematic diagram showing connections being established to notify a registered ICW client computer 110 of a waiting call, in accordance with an embodiment of the invention. When a caller 123 places a call 250 from the caller's telephone set 124 to the ICW subscriber's telephone 106, the local telephone switch 122 determines that the subscriber's telephone line is provisioned with the CFBL. The local telephone switch 122 therefore redirects the incoming call through the PSTN 120 to the call forward number associated with the subscriber line 104. The call forward number directs the call to an available ICW application server, establishing a connection 252 via ISDN trunks 168 in a manner well known in the art. The ICW application server 154 selected to process the incoming call may be different from the ICW application server 154 assigned by the ICW registration server 152 to provide access to ICW services for registering with the ICW service and updating the ICW subscriber profile.

After the connection 252 is established, the ICW application server 154 processing the incoming call establishes a first Internet connection 254 to one of the ICW registration servers 152, to retrieve the subscriber profile associated with the called ICW subscriber 100, using the called party DN contained in ISDN call Set-Up message of the incoming call as a retrieval key.

If the called party DN information is not available, the ICW application server 154 processing the incoming call may be provisioned to request the dialed number from the caller using via voice prompts, such as "A.msg" listed in Table 1.

TABLE 1

| File name | Text | Use |
|---|---|---|
| A.msg | 'Please enter the phone number, including the area code, of the person you are trying to reach.' | Played to the caller when the server receives an invalid called number. |
| B.msg | 'Please hold. The person you are calling is busy at the moment. Please stay on the line while the person is notified of your call.' | Played to the caller when waiting for a call disposition from the ICW subscriber. |
| C.msg | audible ringing tone | Played to the caller while waiting for a call disposition from the ICW subscriber. |
| D.msg | 'The person you are calling cannot answer your call at this time. Please call back later. Thank-you for calling.' | Played to the caller when the subscriber selects the 'Call me back' call treatment option. |
| E.msg | 'The person you are calling cannot answer your call at this time. The person will be calling you back shortly. Thank-you for calling.' | Played to the caller when the subscriber selects the 'I'll call you back' call treatment option. |
| F.msg | 'The person you are calling is not available at the moment. Please leave a message after the tone.' | Played to the caller when the subscriber selects the 'Leave a message' call treatment option. |
| G.msg | 'We are sorry - the person you are calling cannot take your call at this time.' | Played to the caller when the subscriber selects a 'Terminate call' call treatment option. |

On receiving the called ICW subscriber's profile, the ICW application server 154 establishes a second Internet connection 256 with the ICW client computer 110, and sends a notification message respecting the waiting call to ICW client computer 110. On receipt of the notification message, the ICW client software application notifies the ICS subscriber 100 of the waiting call using an audio/visual queue 258, such as a pop-up dialog box on the display screen 112 that displays information about the waiting call. An audible tone may also be played to ensure that the notification is noticed. After the notification message is sent, call processing at the ICW application server 154 is suspended until a call treatment option is selected by the ICW subscriber 100 and returned to the ICW application server 154, or the caller hangs-up. If a response is not received within a predetermined time period, the ICW application server 154 performs a default call treatment option specified in the subscriber profile.

In a windowing computing environment, the pop-up dialog box is preferably implemented as a notification window. The notification window is pushed to the in front of other windows on the ICW subscriber's computer screen 112, and a selectable audible sound may be played to make the ICW subscriber 100 aware of the waiting call, as explained above. Calling name and/or calling number information are displayed in the notification window, if available. The notification window also provides call treatment options that may be selected by the ICW subscriber 100. The ICW subscriber 100 may choose a particular call treatment option by selecting a "button" from the notification window. The ICW subscriber 100 is allotted a predetermined period of time in which to select one of the call treatment options. The ICW application server 154 preferably maintains timers for this purpose.

An announcement is optionally played to the calling party to keep the calling party from assuming that the call has aborted while the ICW subscriber 100 selects a call treatment option. In accordance with one implementation of the invention, the announcement played is a greeting message, an example of which is "B.msg" shown in Table 1. A non-intrusive screening of waiting calls may be provided by playing greeting message "C.msg" also shown in Table 1, which plays a ringing tone to the caller to simulate a ringing of the subscriber phone.

If the ICW subscriber 100 does not select a call treatment option within the predetermined time interval, the ICW application server 154 handles the waiting call in accordance with the ICW subscriber's default call treatment preferences. Default call treatment behavior is invoked as specified in the ICW subscriber profile, as will be described in detail below with reference to FIG. 6.

If the ICW subscriber 100 receives a second call waiting notification during the call disposition selection time period, a second notification window may be presented to the ICW subscriber 100, permitting the ICW subscriber 100 to determine how the respective calls should be handled. All call-waiting notifications are logged in a call log at the ICW client computer 110. Information stored in the call log may include, but is not limited to, the calling party phone number, name, date and time of the call (local system time). Once a waiting call treatment option is selected, the ICW application server 154 handles the waiting call accordingly. The call-waiting treatment option selected may also be recorded in the call log.

Figure 6:
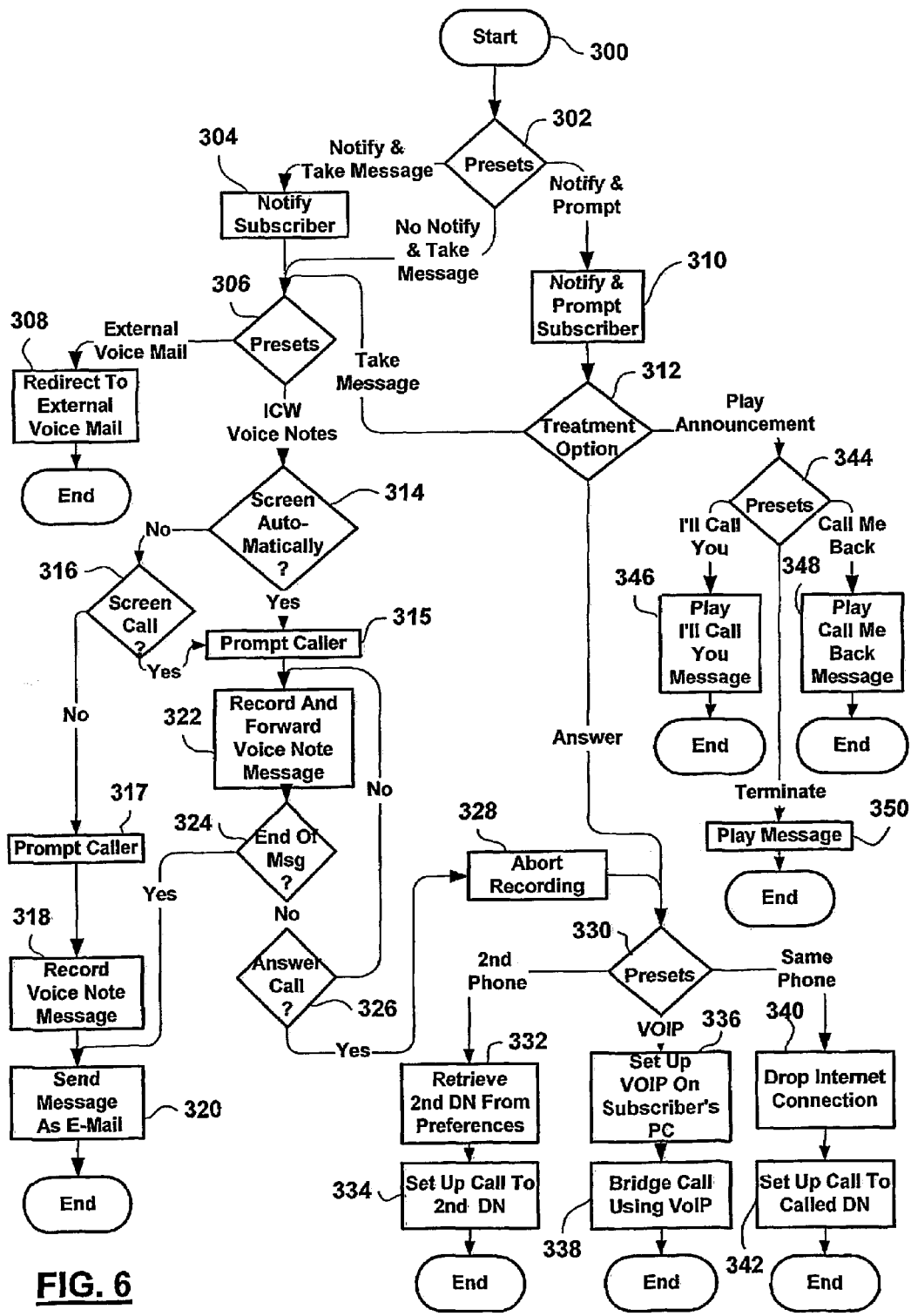
FIG. 6 is a flow diagram showing a process by which waiting calls are handled in accordance with an embodiment of the invention.

FIG. 6 is a flow diagram of a process by which waiting calls are handled in accordance with an embodiment of the invention. The process begins at step 300 when a call to the ICW subscriber 100 is forwarded to the ICW application server. In step 302, the application server evaluates the user preferences for incoming call options, after retrieving the user profile as described above. If the user specifies "notify and automatically take a message", the process proceeds to step 304, "notify subscriber". The subscriber 100 is notified of the incoming call via a pop-up window on the computer display screen 112. The pop-up window displays the caller's phone number and/or the caller's name, as described above. The ICW application server then evaluates the subscriber's pre-selected preferences at step 306 to determine what voice messaging option is specified in the subscriber's profile. If external voice mail is specified, the process continues at step 308. The call is redirected from the ICW application server to an external voice mail service and the process ends. Otherwise, the process proceeds to the ICW "voice notes" option (steps 314–342), as will be explained below in detail.

If it is determined in step 302 that the subscriber profile specifies a "take a message and do not notify" option, the process proceeds directly to steps 306 and 308, after which the process ends, as described above, or proceeds to the "voice notes" option (steps 314–342), as will be explained below.

If, however, it is determined in step 302 that the subscriber profile specifies a "notify and prompt" option, the process proceeds to step 310 "notify and prompt subscriber". The subscriber 100 is notified of the incoming call via a pop-up window on computer screen 112. The pop-up window displays the caller's phone number and/or caller's name (if available), and other information described above with reference to step 304. The subscriber is presented with a selection of call treatment options in step 312. If the user selects "take a message", the process proceeds to step 306. At step 306, if ICW voice messaging is specified in the subscriber's profile, the process proceeds to step 314 where the ICW server determines the user's pre-selected "screen and answer call" preferences. If "screen automatically" is set to "no" then the process proceeds to step 316 where the subscriber is prompted to specify whether he wishes to screen the call. If the subscriber selects "no", the ICW server prompts the caller to leave a voice message (step 317) and records a "voice note" message at step 318. At step 320 the ICW server forwards the recorded "voice note" message as an audio file attachment to an e-mail which is addressed to the subscriber's e-mail address. The subscriber's e-mail address is stored in the user profile. If it is determined at step 314 that the subscriber's profile specifies "yes" to "screen automatically", the process proceeds to step 315. Likewise, if at step 316 it is determined that the subscriber has selected "yes" in response to the prompt for screening the call, the process also flows to step 315. At step 315, the ICW server plays a voice prompt to the caller requesting that the caller leave a voice message. Preferably the voice prompt emulates a voice mail system and may be a recording prepared by the subscriber, or may be a prerecorded message, such as message "F.msg" shown in Table 1.

At step 322, the ICW server starts recording the caller's message and simultaneously forwards the message over the data connection in real-time to the subscriber. The message is forwarded in packets, preferably as streaming audio, but other audio formats known to persons skilled in the art may also be used. If the subscriber does not interrupt the caller's message, the message is completed at step 324, and the process continues to step 320, as described above. The program loop through steps 322–316 is repeatedly performed to determine if the subscriber 100 wishes to interrupt the message and answer the call. If the user does not opt to interrupt the message, the process loops back to step 322 where recording and forwarding of the message continues.

In accordance with an embodiment of the invention, the ICW subscriber 100 screens the waiting call in a non-intrusive manner while the message is being left. The caller is not aware that the ICW subscriber 100 is screening the call. Forwarding the "voice note" message to the subscriber 100 in real-time permits the subscriber to determine the identity of the caller with more certainty than just the phone number (and/or name) associated with the caller's telephone line. By listening to the message being left by the caller, the subscriber can also determine if the intended purpose of the call is sufficiently important to interrupt his Internet session. If the subscriber decides to answer the call, the process continues to step 328, where the recording of the message is aborted. The message is discarded and the process proceeds to an examination of the subscriber profile for call completion options at step 330. If at step 312, the subscriber decided to answer the call when prompted with the caller's name and/or phone number, the process likewise continues at step 330.

At step 330, the subscriber's pre-specified call answer preferences are examined in the subscriber profile. If the subscriber profile specifies that calls are to be directed to a second telephone line, the process continues at step 332, where the ICW server retrieves an alternate directory number from the subscriber's profile. At step 334, the ICW server then redirects the call through the PSTN to the second directory number. The second directory number may be associated with a second local loop (not shown) at the ICW subscriber's premises 102, a cellular telephone, or the like.

If the subscriber profile specifies that calls are to be answered using Voice over IP (VoIP), the process continues at step 336. The VoIP option permits the subscriber to answer the call using his computer by sending the voice signals in data packets over the data connection, in a manner well known in the art. At step 336, the ICW server sets up a VoIP connection to the user's computer and at step 338, the ICW server bridges the call to the VoIP connection. The subscriber's computer must be equipped with appropriate software, a microphone and speakers to enable the VoIP option, as is well understood. This option permits the subscriber to talk with the caller without disconnecting from the Internet.

If the subscriber profile specifies that calls are to be answered on the subscriber's primary phone line, the process continues at step 340. In that case, the subscriber's Internet connection is dropped in order to permit the call to be answered. At step 340, the ICW system drops the Internet connection and the subscriber's local loop is returned to an on-hook condition. At step 342, the ICW server redirects the call through the PSTN back to the subscriber's local loop, which permits the subscriber to answer the incoming call.

At step 312, if the subscriber selected "play announcement", the process continues to step 344 where the user's pre-specified preference is determined. If the subscriber selected "I'll Call You" from the call treatment options presented in the pop-up window, the process proceeds at step 346, where an announcement such as "E.msg" shown in Table 1 is played to the caller. If the subscriber selected "Call Me Back" from the call treatment options, the process proceeds to step 348, where an announcement such as "D.msg" shown in Table 1 is played to the caller. If the subscriber selected "Terminate Call" from the call treatment options, the process proceeds to step 350, where an announcement such as "F.msg" shown in Table 1 is played to the caller.

If the ICW subscriber 100 receives a call notification during a telephone session answered at the ICW client computer 110 via VoIP, another notification window is displayed on the display screen 112, and the call is logged. The subscriber can then screen the second call by selecting a call treatment option for the second call. If a selected call treatment option cannot be applied because of resource or network unavailability, the second call is sent to messaging.

The subscriber 100 is automatically de-registered from an ICW service session when the Internet connection is dropped.

A Call Forward Unconditional (CFU) feature forces all calls to a Directory Number (DN) to be redirected to another PSTN termination. CFU has precedence over CFBL and may be used by an ICW subscriber 100 to redirect all incoming calls to the ICW service node 150. If the subscriber enables CFU, after specifying in his profile that calls are to be answered on his primary phone line, then at step 342, the ICW server would attempt to redirect the call through the PSTN back to the user's phone line, at which point, the CFU feature would transfer the call back to the ICW service node 150. A loop detection process detects this condition and ends the call with a busy call treatment. VoIP bridging of the call is the only option if CFU is applied to the line.

Although the invention has been described with exclusive reference to POTS subscriber loops, it should be understood that the invention is equally adapted for use with other telephone services that support only one concurrent transmission mode. The invention is therefore adapted to be used for narrowband wireless services, and the like.

Furthermore, although the invention has been described for sake of simplicity with reference to call termination and redirection being handled directly by ICW servers 154, it should also be understood that call termination and redirection services may be provided by an intermediate switching network in a manner known in the art.

The embodiments of the invention described above are intended to be exemplary only. The scope of the invention is therefore intended to be limited solely by the scope of the appended claims.

The invention claimed is:

1. A method of processing a telephone call from a calling station to a called station that is busy as a result of having established a data connection to a data network via an access server, the method comprising steps of:
   receiving the call at a telephone network switch;
   responsive to the called station being busy, forwarding the call to a call-waiting application server; and
   responsive to receiving the call at the call-waiting application server, sending a data message to computer equipment at the called station used to establish the data connection, to notify a subscriber at the called station of an incoming call and providing a selection of call treatment options to the subscriber, comprising steps of:
   a) storing at a registration server a complete copy of a subscriber profile for each subscriber to the system, the profile defining subscriber pre-selected preferences for incoming call processing options and call treatments;
   b) registering the subscriber at the registration server when the subscriber establishes the data connection to the data network via the access server;
   c) accepting at one of a plurality of application servers, the telephone call placed to the subscriber by a caller from the calling station, when the subscriber's telephone line is busy, the application server establishes a data connection to the registration server to retrieve a copy of the subscriber profile when the telephone call is accepted, and inspects the subscriber profile to determine how the incoming call should be processed based upon the pre-selected subscriber preferences.

2. A method as claimed in claim 1 further comprising a step of checking the subscriber profile to determine whether the subscriber should be notified of the waiting call from the caller.

3. A method as claimed in claim 2 further comprising a step of notifying the subscriber of the waiting call and prompting the subscriber for a selecting a pre-determined call treatment option for the waiting call based upon the pre-selected subscriber preferences in the subscriber profile.

4. A method as claimed in claim 2 further comprising a step of examining the subscriber profile to determine whether the caller should be requested to leave a voice message for the subscriber.

5. A method as claimed in claim 4 further comprising a step of recording a voice message left by the caller, or forwarding the caller to an external voice mail system.

6. A method as claimed in claim 5, further comprising a step of, on instructions received from the subscriber, completing the call to the subscriber via a predetermined path.

7. A method as claimed in claim 6, further comprising a step of rerouting the call to an alternate called station associated with the predetermined path.

8. A method as claimed in claim 6, further comprising a step of dropping the data connection to the data network and rerouting the call to the called station.

9. A method as claimed in claim 6, further comprising a step of bridging the call from the call-waiting application server through the data network to the computer equipment at the called station as a Voice-over-data network call.

10. A method as claimed in claim 9, wherein the computer equipment at the called station is an IP (Internet protocol) node, and the call is set up using Voice-over-IP (VoIP) protocol.

11. A method as claimed in claim 5, wherein if a voice message left by the caller is recorded, the method further comprises a step of relaying the voice message to the computer equipment in a User Datagram Protocol (UDP) packet stream.

12. A method as claimed in claim 5, wherein if a voice message left by the caller is recorded, the method further comprises a step of relaying the voice message to the computer equipment as streaming audio.

13. A method as claimed in claim 5, wherein if a voice message left by the caller is recorded, the method further comprises a step of forwarding as an audio file attachment to an electronic mail message sent to the subscriber, the voice message left by the caller.

14. A method as claimed in claim 13, wherein the audio file is in .wav format.

15. A system for providing call screening capabilities to a subscriber whose telephone line is busy as a result of having established a data connection to a data network via an access server, comprising:
  a) at least one registration server for storing a complete copy of a subscriber profile for each subscriber to the system, the profiles defining subscriber pre-selected preferences for incoming call processing and call treatments options, and for registering the subscriber when the subscriber establishes the data connection to the data network via the access server;
  b) a plurality of application servers for accepting telephone calls placed to the subscriber by a caller when the subscriber's telephone line is busy, the application servers establish a data connection to the at least one registration server to retrieve a copy of the subscriber profile when a one of the telephone calls is accepted and for inspecting the subscriber profile to determine how incoming calls should be processed based upon pre-selected subscriber preferences; and
  c) a compatible client component on a computer operated by the subscriber to establish the data connection, the client component establishing a data connection to the at least one registration server to register the subscriber after the data connection to the data network is established.

16. A system as claimed in claim 15, wherein the application servers establish a second data connection to the client component when the telephone call is accepted, and the client component is further adapted to present the subscriber with a selection of call treatment options based upon the pre-selected subscriber preferences defined in the subscriber profile, and to accept the subscriber's selection of a one of the call treatment options and to relay the selection to the application server.

17. A system as claimed in claim 11, wherein the application server completes the call to the subscriber via a specified path stored in the subscriber profile, if the subscriber elects to answer the call.

18. A system as claimed in claim 13 wherein the profile stores a directory number for an alternate telephone connection as the specified path for completing the call.

19. A system as claimed in claim 17, wherein the profile stores the subscriber's directory number, and the client component is adapted to drop the connection to the data network and the application server is adapted to reroute the call to the subscriber's directory number if the subscriber elects to answer the call.

20. A system as claimed in claim 13, wherein the profile stores an option to establish a Voice-over-Internet Protocol (VoIP) connection to the client component, and the server component is adapted to bridge the call via the data connection to the client component, and the client component is adapted to provide a client side of the VoIP connection for the call to the subscriber.

21. A system as claimed in claim 11, wherein the application servers relay a voice message being left by the caller to the client component as streaming audio.

22. A method as claimed in claim 21, wherein the application servers create an audio file containing a voice message left by the caller and to attach the audio file to an electronic mail message that is sent to the subscriber.

23. A method as claimed in claim 22, wherein the audio file is in .wav format.

* * * * *